(12) United States Patent
Kim et al.

(10) Patent No.: US 11,178,525 B2
(45) Date of Patent: Nov. 16, 2021

(54) V2X COMMUNICATION DEVICE AND OBE MISBEHAVIOR DETECTION METHOD THEREOF

(71) Applicant: LG ELECTRONICS INC., Seoul (KR)

(72) Inventors: Jinwoo Kim, Seoul (KR); Woosuk Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/044,319

(22) PCT Filed: Apr. 9, 2018

(86) PCT No.: PCT/KR2018/004161
§ 371 (c)(1),
(2) Date: Sep. 30, 2020

(87) PCT Pub. No.: WO2019/198837
PCT Pub. Date: Oct. 17, 2019

(65) Prior Publication Data
US 2021/0084461 A1 Mar. 18, 2021

(51) Int. Cl.
*H04W 4/40* (2018.01)
*H04W 4/20* (2018.01)

(52) U.S. Cl.
CPC ............ *H04W 4/40* (2018.02); *H04W 4/20* (2013.01)

(58) Field of Classification Search
CPC ......... H04W 4/40; H04W 4/20; H04W 12/12; H04W 12/06
See application file for complete search history.

(56) References Cited

U.S. PATENT DOCUMENTS

| 8,849,993 B2* | 9/2014 | Cooper | H04L 41/22 709/224 |
| 2013/0278440 A1* | 10/2013 | Rubin | G01C 21/3658 340/903 |

(Continued)

FOREIGN PATENT DOCUMENTS

WO 2017033486 3/2017

OTHER PUBLICATIONS

Brecht et al., A Security Credential Management System for V2X Communication, Cornell University arXiv abs, pp. 1-25 (Year: 2018).*

(Continued)

*Primary Examiner* — Lewis G West
(74) *Attorney, Agent, or Firm* — Lee, Hong, Degerman, Kang & Waimey PC

(57) ABSTRACT

Disclosed is an on board equipment (OBE) misbehavior detection method of a vehicle to everything (V2X) communication device. An OBE misbehavior detection method of a V2X communication device, according to one embodiment of the disclosure, comprises the steps of: transmitting a beacon including information associated with a misbehavior inspection zone (MIZ); receiving a report on a possible MV-OBE; transmitting a warning message to a suspected MV-OBE; and receiving a response message for the warning message from the suspected MV-OBE within a valid response time or when the response message is not received within the valid response time, transmitting a report on the suspected MV-OBE to a security system.

14 Claims, 12 Drawing Sheets

(56) References Cited

U.S. PATENT DOCUMENTS

| | | | |
|---|---|---|---|
| 2013/0297195 A1 | 11/2013 | Das et al. | |
| 2014/0358324 A1 | 12/2014 | Sagar et al. | |
| 2016/0119151 A1 | 4/2016 | Park et al. | |
| 2018/0075750 A1* | 3/2018 | Takamura | H04W 4/70 |
| 2019/0068582 A1* | 2/2019 | Kim | G07C 5/008 |
| 2019/0068639 A1* | 2/2019 | Alexander | H04W 4/46 |
| 2019/0149610 A1* | 5/2019 | Jayaraman | B60R 25/24 |
| | | | 713/155 |
| 2019/0197461 A1* | 6/2019 | Anderson | G06Q 50/20 |
| 2019/0200228 A1* | 6/2019 | Adrangi | H04W 12/0431 |
| 2019/0245831 A1* | 8/2019 | Petit | H04W 12/106 |
| 2019/0258242 A1* | 8/2019 | Avery | G06K 9/00979 |
| 2019/0268367 A1* | 8/2019 | Willis | G06F 21/554 |
| 2019/0297499 A1* | 9/2019 | Hawkes | H04W 12/40 |
| 2019/0312738 A1* | 10/2019 | Barrett | H04W 12/088 |
| 2019/0312896 A1* | 10/2019 | Petit | H04L 63/1416 |
| 2019/0339082 A1* | 11/2019 | Doig | G06F 16/29 |
| 2019/0371085 A1* | 12/2019 | Kishikawa | G08G 1/0112 |
| 2019/0373609 A1* | 12/2019 | Kim | H04W 36/06 |
| 2020/0045552 A1* | 2/2020 | Kim | H04L 9/3268 |
| 2020/0139980 A1* | 5/2020 | Liu | H04W 12/122 |
| 2020/0280842 A1* | 9/2020 | Liu | H04W 12/009 |
| 2020/0404018 A1* | 12/2020 | Naserian | H04W 4/40 |
| 2020/0413264 A1* | 12/2020 | Han | H04W 12/68 |
| 2021/0067926 A1* | 3/2021 | Hwang | H04W 4/44 |
| 2021/0112417 A1* | 4/2021 | Geissler | H04W 12/104 |

OTHER PUBLICATIONS

PCT International Application No. PCT/KR2018/004161, International Search Report dated Jan. 7, 2019, 3 pages.

Brecht, B. et al., "A Security Credential Management System for V2X Communications," arXiv:1802.05323v1 [cs.CR], Feb. 2018, 25 pages.

* cited by examiner

<Detection and Report>

<Authorization Refusal>

<CRL Distribution>

<Detection>

<warning and report>

(a) Boundary indication

▲ authorized RSE or OBE

◯ Communication coverage

── Road

◌ MIZ (b) Full overlapped region indication

V2X COMMUNICATION DEVICE AND OBE MISBEHAVIOR DETECTION METHOD THEREOF

CROSS-REFERENCE TO RELATED APPLICATION

This application is the National Stage filing under 35 U.S.C. 371 of International Application No. PCT/KR2018/004161, filed on Apr. 9, 2018, the contents of which are all incorporated by reference herein in their entirety.

TECHNICAL FIELD

The disclosure relates to a V2X communication device and a method for detecting a misbehaving on-board equipment (OBE) by the same and, in particular, to a method for detecting and handling an OBE of a misbehaving vehicle by an OBE/road side equipment (RSE), not a security system level.

BACKGROUND ART

Nowadays, vehicles are being changed from a product of mechanical engineering to a product of complex industrial technology in which electrical, electronic, and communication technologies are converged and thus the vehicle is referred to as a smart car. The smart car connects a driver, a vehicle, and a traffic infrastructure to provide various user customized moving services as well as traditional vehicle technology such as a traffic safety/complex solution. Such connectivity may be implemented using Vehicle to Everything (V2X) communications technology.

DETAILED DESCRIPTION OF THE DISCLOSURE

Technical Problem

In the future traffic system, OBEs of vehicles, RSEs of road peripheral devices, and non-vehicle participants around the road perform V2X communication based on ad-hoc technology. V2X communication is performed to prevent accidents, human damage, and property loss that occur on the road by sharing information about their condition and surrounding environment by vehicles/non-vehicles. V2X communication technology is advancing to enhance the efficiency of resource utilization from the standpoint of the entire transportation system, not only for safety-related purposes but also by optimizing resource consumption (e.g., traffic congestion) occurring on the road.

Various pieces of information shared through V2X communication need to be protected from various security issues, such as exposure the privacy of the message sender, generation of incorrect information due to a device error of the message sender, information manipulation by the selfish intention of the message sender, and falsification of message by a third party while the message is delivered.

Technical Solution

To address the foregoing issues, according to an embodiment of the disclosure, a V2X communication device may perform the above-described misbehaving OBE detection method.

According to an embodiment of the disclosure, a method for detecting a misbehaving on-board equipment (OBE) by a vehicle-to-everything (V2X) communication device may comprise transmitting a beacon including misbehavior inspection zone (MIZ)-related information, the MIZ being a misbehavior inspection zone in which at least one authorized road side equipment (RSE)/OBE detects a misbehaving vehicle (MV)-OBE, and the V2X communication device corresponding to an OBE or RSE authorized for a misbehavior detection (MBD) operation, receiving a report for a possible MV-OBE, transmitting a warning message to a suspicious MV-OBE, and based on receiving, or failing to receive, a message responsive to the warning message from the suspicious MV-OBE within a response valid time, transmitting a report for the suspicious MV-OBE to a security system.

According to an embodiment of the disclosure, in the method for detecting the misbehaving OBE by the V2X communication device, the beacon may include at least one of MBD authorization information, MIZ identity information, member group information, V2X communication control information, or activity valid time information. The MBD authorization information may prove that the V2X communication device has an MBD authority, the MIZ identity information may identify at least one RSE/OBE constituting one MIZ, the member group information may indicate a location of the at least one RSE/OBE having the same MIZ identity, the V2X communication control information may provide V2X communication parameters of OBEs in the MIZ, and the activity valid time information may indicate a limited time during which the authorized RSE/OBE performs an MBD operation.

According to an embodiment of the disclosure, in the method for detecting the misbehaving OBE by the V2X communication device, the report for the possible MV-OBE may include at least one of suspicious MV-OBE identity information, reporter identity information, or MV-OBE type information. The suspicious MV-OBE identity information may be a certificate for identifying the suspicious MV-OBE, the reporter identity information may be a certificate for identifying an OBE transmitting the report for the MV-OBE, and the MV-OBE type information may indicate a reason why a report target OBE is determined to be the suspicious MV-OBE.

According to an embodiment of the disclosure, in the method for detecting the misbehaving OBE by the V2X communication device, the warning message may include at least one of target OBE identity information, MV-OBE type information, or response valid time information. The target OBE identity information may be a certificate for identifying the suspicious MV-OBE, the MV-OBE type information may indicate a reason why an OBE receiving the warning message is determined to be the suspicious MV-OBE, and the response valid time information may indicate the response valid time when reception of a response to the warning message from the suspicious MV-OBE is awaited.

According to an embodiment of the disclosure, in the method for detecting the misbehaving OBE by the V2X communication device, the response message may include at least one of OBE identity information, handling type information, handling time information, or ACK information. The OBE identity information may be a certificate for identifying the suspicious MV-OBE, the handling type information may be information for clarifying handling for a detected misbehavior issue, the handling time information may be information designating a time expected to handle the detected misbehavior issue, and the ACK information may indicate an acknowledgement and response to the warning message.

According to an embodiment of the disclosure, in the method for detecting the misbehaving OBE by the V2X communication device, the report for the suspicious MV-OBE may include at least one of the suspicious MV-OBE identity information, reporter identity information, or MV-OBE type information. The suspicious MV-OBE identity information may be a certificate for identifying the suspicious MV-OBE, the reporter identity information may be a certificate for identifying the V2X communication device transmitting the report for the MV-OBE, and the MV-OBE type information may indicate a reason why a report target OBE is determined to be the suspicious MV-OBE.

According to an embodiment of the disclosure, in the method for detecting the misbehaving OBE by the V2X communication device, the response message may be received over unicast or broadcast.

Advantageous Effects

According to the disclosure, it is possible to efficiently detect and handle a misbehaving vehicle or an OBE of a misbehaving vehicle. According to the disclosure, the method for detecting and handling a misbehaving vehicle may be performed in parallel with the misbehaving vehicle detecting and handling method performed by the PKI-SMS or may be locally distributively and separately performed. Thus, network loads or processing delay may be reduced.

In particular, according to the disclosure, it is possible to prevent an overhandling, such as network blocking, for non-malicious vehicles. According to the disclosure, it may be possible to instead indicate that a non-malicious vehicle or a vehicle with temporary failure has an issue and to provide a chance of being able to quickly address the issue in a reliable network.

BRIEF DESCRIPTION OF DRAWINGS

The accompanying drawings provided for a better understanding of the disclosure as part of the instant application constitute embodiments of the disclosure along with the detailed description of the disclosure.

MODE FOR CARRYING OUT THE DISCLOSURE

Preferred embodiments of the disclosure will be described in detail with reference to the accompanying drawings. The following detailed description with reference to the attached drawings is for the purpose of illustrating preferred embodiments of the disclosure rather than illustrating only embodiments that may be implemented according to embodiments of the disclosure. The following detailed description includes details in order to provide a thorough understanding of the disclosure, but the disclosure does not require all of these details. The disclosure is not limited to separately use each of embodiments described hereinafter. Multiple embodiments or all of embodiments may be used together, and specific embodiments may be used as a combination.

Most of terms used in the disclosure are selected from common ones widely used in the field, but some terms are arbitrarily selected by the applicant and a meaning thereof will be described in detail in the following description, as needed. Accordingly, the disclosure should be understood based on an intended meaning of the term rather than a mere name or meaning of the term.

The disclosure relates to a V2X communication device. The V2X communication device may be included in an intelligent transport system (ITS) and may perform all or some functions of the ITS system. The V2X communication device may enable communication between vehicles, between a vehicle and infrastructure, between a vehicle and bicycle, or communication with a mobile device. The V2X communication device may be abbreviated as a V2X device. According to an embodiment, the V2X device may correspond to an on-board unit (OBU) of a vehicle or may be included in an OBU. OBU may also be denoted OBE(On Board Equipment). The V2X device may correspond to a road-side unit (RSU) of an infrastructure or may be included in an RSU. RSU may also be denoted roadside equipment (RSE). Or, the V2X communication device may correspond to an ITS station or may be included in an ITS station. Any OBU, RSU, and mobile equipment performing V2X communication may collectively be referred to as an ITS station or V2X communication device.

Figure 1:
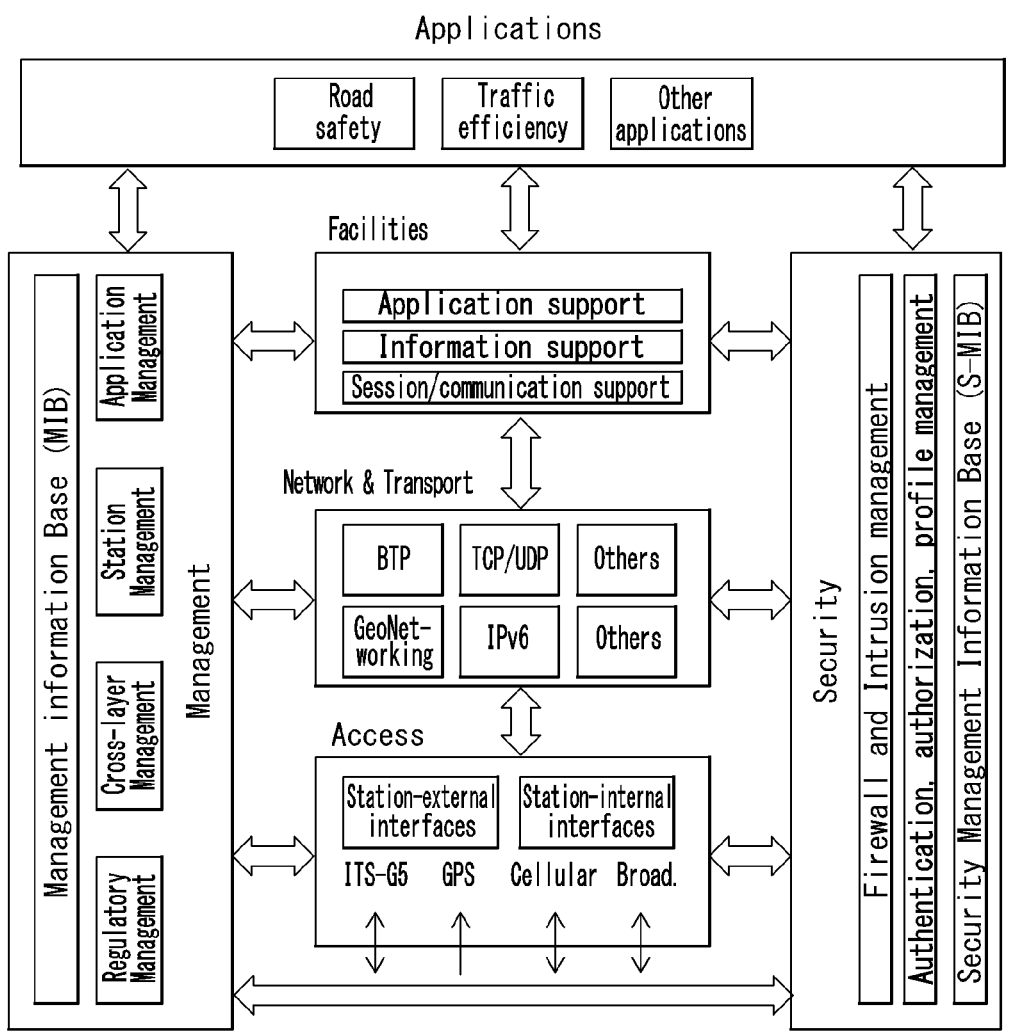
FIG. 1 illustrates a reference architecture of an intelligent transport system (ITS) according to an embodiment of the disclosure.

FIG. 1 illustrates a reference architecture of an intelligent transport system (ITS) according to an embodiment of the disclosure.

In the architecture of FIG. 1, two end vehicles/users may perform communication network communication and such communication may be performed via the function of each layer of the architecture of FIG. 1. For example, when messages are communicated between vehicles, in the transmit vehicle and its ITS system, data may be transferred down through each layer and, in the reception vehicle and its ITS system, data may be transferred up through each layer. Each layer is described below with reference to FIG. 1.

Application layer: The application layer may implement and support various use cases. For example, the application may provide road safety, efficient traffic information, and other application information.

Facilities layer: The facilities layer may provide support for effectively implementing various use cases defined in the application layer. For example, the facilities layer may perform application support, information support, and session/communication support.

Networking & transport layer: The networking/transport layer may configure a network for vehicular communication between homogeneous/heterogeneous networks by using various transport protocols and network protocols. For example, the networking/transport layer may provide routing with the internet access using the internet protocol, such as TCP/UDP+IPv6. Or, the networking/transport layer may configure a vehicle network using a geographical position-based protocol, such as basic transport protocol (BTP)/geonetworking.

Access layer: The access layer may transmit messages/data received from the higher layer via a physical channel. For example, the access layer may perform/support data communication based on, e.g., IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology.

The ITS architecture may further include a management layer and a security layer.

In the future traffic system, OBEs of vehicles, RSEs of road peripheral devices, and non-vehicle participants around the road perform V2X communication based on ad-hoc technology. V2X communication is performed to prevent accidents, human damage, and property loss that occur on the road by sharing information about their condition and surrounding environment by vehicles/non-vehicles. V2X communication technology is advancing to enhance the efficiency of resource utilization from the standpoint of the entire transportation system, not only for safety-related purposes but also by optimizing resource consumption (e.g., traffic congestion) occurring on the road. Various pieces of information shared through V2X communication need to be protected from various security issues, such as exposure the privacy of the message sender, generation of incorrect information due to a device error of the message sender, information manipulation by the selfish intention of the message sender, and falsification of message by a third party while the message is delivered. To minimize loss due to security issues, a public key infrastructure (PKI)-based security management system (SMS) is established, and the PKI-SMS directly involves the message transfer process.

Described below are a structure in which the PKI-SMS handles message security issues and a method in which the PKI-SMS shares wrong information during the information sharing process and manages the misbehaving vehicle (MV-OBE) which may harm its surrounding vehicles.

The PKI-SMS is a trust-based system present over a network. V2X communication is protected from various security issues under the assumption that the trust-based system is not damaged. The PKI-SMS requires an enrollment process for the OBE to participate in V2X communication. Further, the PKI-SMS periodically requires an authorization process which is a process for obtaining a service or message-level sending authority so as to exchange various messages for V2X communication. In the disclosure, authorization may also be referred to as authorization of authority.

If these processes all are normally complete, the OBE may perform a substantial message exchange on the road. Each process is performed by a security information exchange between the PKI-SMS and the OBE via a security-guaranteed wired or wireless channel. The OBE stores, in the security module of the OBE, the certificate that all authority entities in the PKI-SMS guarantee key information for signing the message in a service range where a post authority is obtained and trust therefor. The OBE transmits the certificate along with a signature (signing field) for the information desired to be shared upon sending the message. As such, since the trust guaranteed by the PKI-SMS regards a service/message, handling when the MV-OBE shares wrong information is very limited from a PKI-SMS point of view.

The MV-OBE may cause and share erroneous information inconsistent with the current road environment due to various causes, and its surrounding vehicles may recognize the same in various manners. For example, where the MV-OBE manipulates its current location information and shares the same with a message, if the location information of the MV-OBE actually detected by the sensor of the ambient OBE or RSE differs from the location information received from the MV-OBE, the location information transmitted from the MV-OBE may be suspicious as wrong information. Where the MV-OBE manipulates the current traffic control context therearound and shares the same with a message, if the same is compared with the information shared by other nearby OBE/RSE, and a difference is revealed, the context information transmitted from the MV-OBE may be suspicious as wrong information. As such, an abnormal behavior of the MV-OBE may be recognized in such a manner that another OBE or RSE present around the MV-OBE double-checks the same information.

The misbehavior of the MV-OBE may be transferred to the PKI-SMS via various paths. The PKI-SMS may analyze a report related to the received misbehavior and analyze and select a specific OBE being the MV-OBE. Among the entities constituting the PKI-SMS, authority entities analyzing and selecting the MV-OBE may include, e.g., an enrollment authority (EA), an authorization authority (AA), and a root certificate authority (RCA). The configuration of the PKI-SMS may differ from country to country. In the U.S., a separate authority entity (AE), called misbehavior authority (MA), exists for the above-described purposes.

During the course of exchanging information between AEs, various authority entities (AEs) may collaborate to select the MV-OBE to distribute the roles of the security management system and OBE privacy. If the MV-OBE is selected, a certificate revocation list (CRL) is issued in such a fashion that the RCA at the highest level guarantees trust. The CRL is distributed to all the entities in the PKI-SMS and OBEs and RSEs allowed for V2X communication therethrough. The CRL includes, e.g., the ID and access information for identifying the MV-OBE and the current context, so that the PKI-SMS possessing the CRL and all the OBEs and RSEs performing V2X communication may recognize the MV-OBE and handle. Each entity may have a different method of handling the MV-OBE by the CRL.

FIGS. 2 to 5 illustrate a method in which the PKI-SMS handles the MV-OBE according to an embodiment of the disclosure.

FIGS. 2 to 5 illustrate that the misbehavior authority (MA) plays a major role to select the MV-OBE for ease of description. However, substantially, the EA, AA, and RCA may distributively perform the role. Network AP/infrastructure may denote a road infrastructure (RI) fixedly installed around the road, RSE, or cellular infrastructure (CI)/nodeB. The network AP/infrastructure plays a role as a gateway that relays communication between the OBE and the PKI-SMS via a stable connection with the PKI-SMS.

Figure 2:
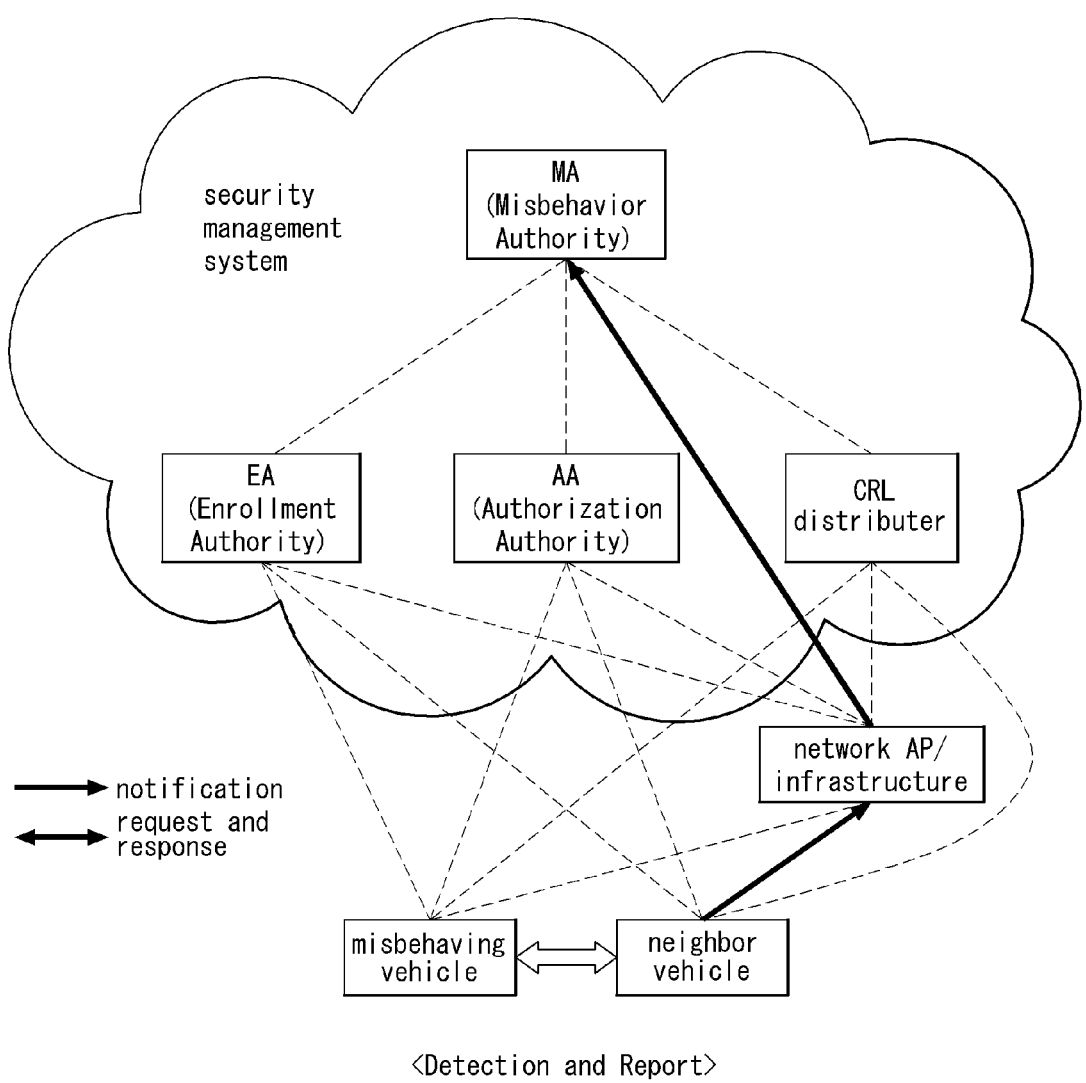
FIG. 2 illustrates a process of detecting and reporting a misbehaving vehicle according to an embodiment of the disclosure.

FIG. 2 illustrates a process of detecting and reporting a misbehaving vehicle according to an embodiment of the disclosure.

In FIG. 2, if a vehicle suspicious as a misbehaving vehicle is recognized by a neighbor vehicle or infrastructure, the neighbor vehicle or the AP/infrastructure reports the same to the MA. The MA receives the report of misbehaving vehicle via various temporal/spatial paths. The MA may comprehensively analyze data for a long term, rather than short-term misbehavior, for precise analysis. The analysis of misbehaving vehicle may be accumulated per OBE and may be performed centered on districts or behavior types. The massive battery analysis requires much time and data compiling and needs latency even in processing simple behavior. If a CRL occurs as a result of the analysis, each entity, OBE, and RSE individually possess the CRL. The distribution of CRLs may be performed entirely by the entity, called a distribution center.

Figure 3:
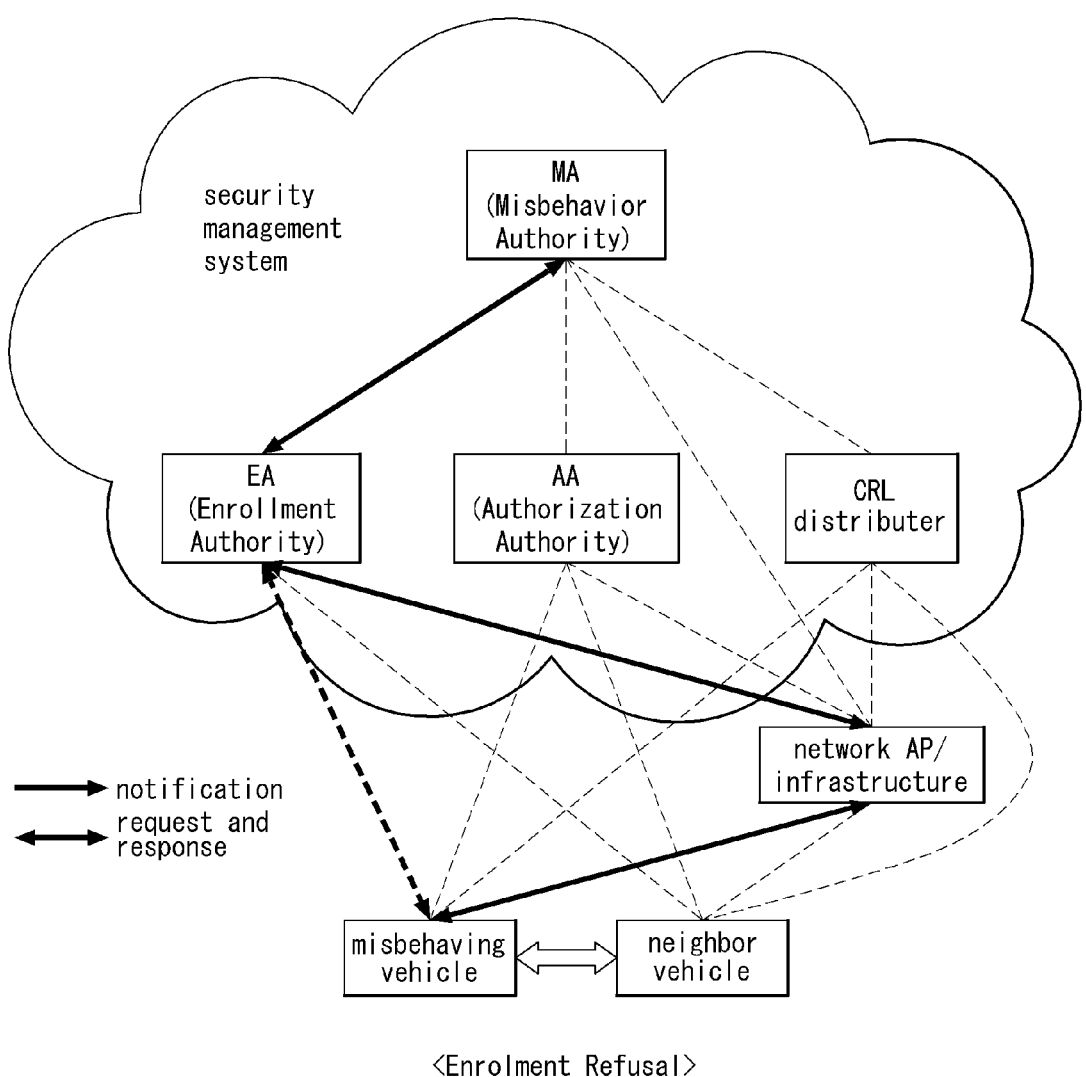
FIG. 3 illustrates an example of refusing enrollment of a misbehaving vehicle by an EA according to an embodiment of the disclosure.

FIG. 3 illustrates an example of refusing enrollment of a misbehaving vehicle by an EA according to an embodiment of the disclosure.

Referring to FIG. 3, the EA may refuse an attempt to re-enroll, made by the misbehaving vehicle, preventing the misbehaving vehicle from belonging to the trust domain.

Figure 4:
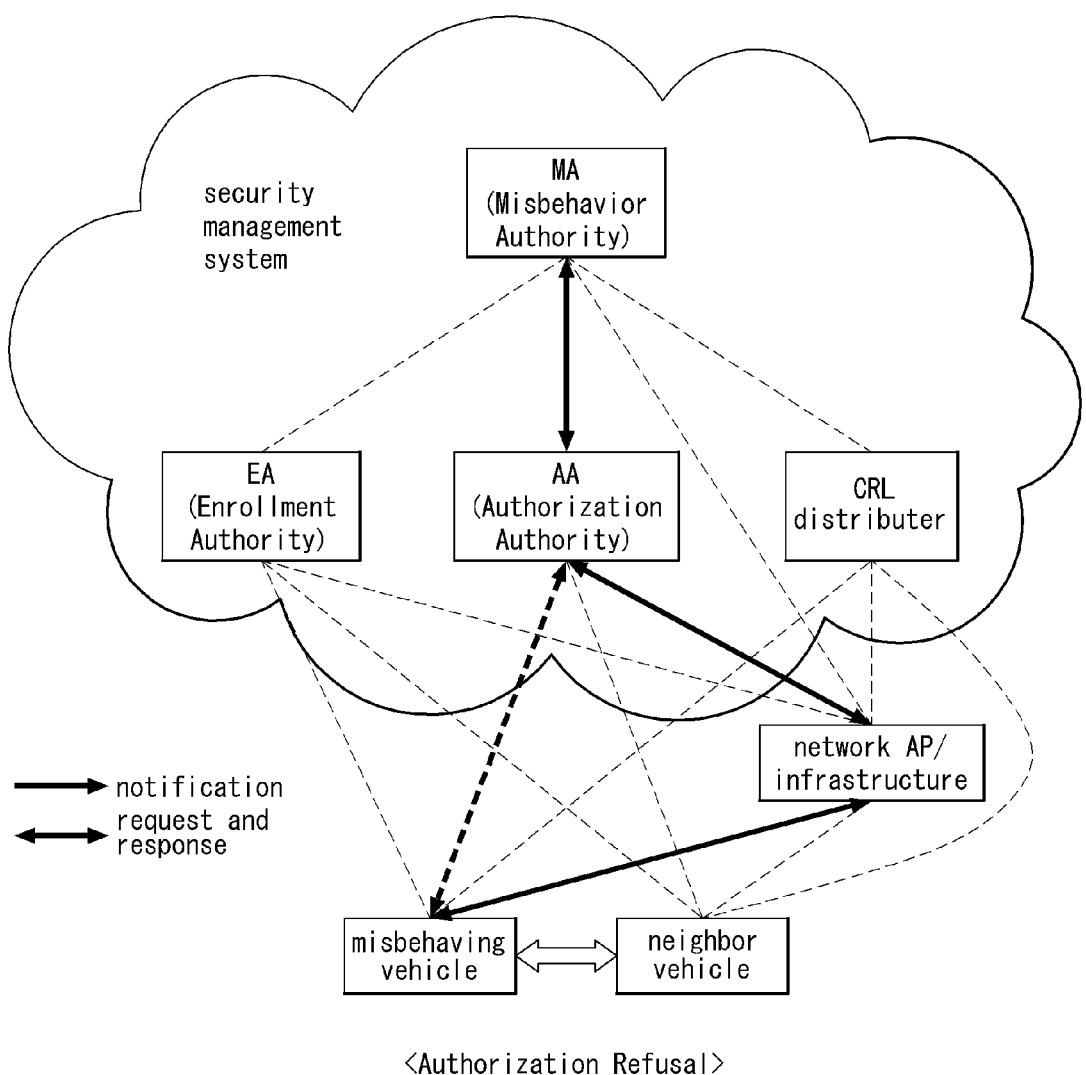
FIG. 4 illustrates an example of refusing authorization of an authority for a misbehaving vehicle by an AA according to an embodiment of the disclosure.

FIG. 4 illustrates an example of refusing authorization of an authority for a misbehaving vehicle by an AA according to an embodiment of the disclosure.

Referring to FIG. 4, the AA may refuse a request for reauthorization of authority made by the misbehaving vehicle. In the case of the MV-OBE which has already enrolled and has the valid time left, the authorization may be refused during the course of the reauthorization of authority required relatively frequently as compared with enrollment as shown in FIG. 4. In this case, the certificate attached with the message sent out for the MV-OBE to share information with the neighbor OBE or RSEs is invalidated. Thus, the neighbor OBE or RSE may recognize that the corresponding OBE is untrustable.

Figure 5:
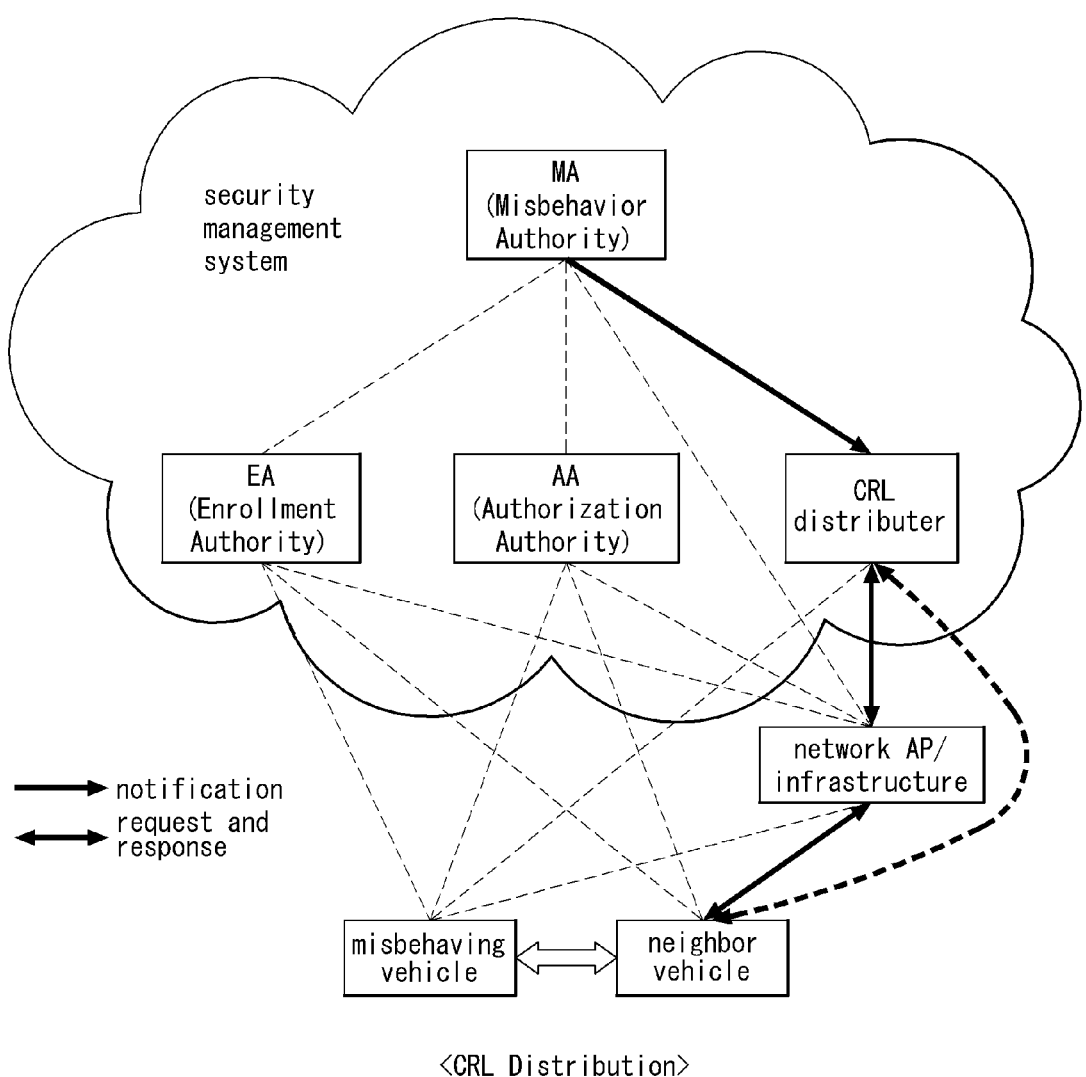
FIG. 5 illustrates a CRL distribution and CRL comparison according to an embodiment of the disclosure.

FIG. 5 illustrates a CRL distribution and CRL comparison according to an embodiment of the disclosure.

Where enrollment and (authority) authorization both are performed recently so that the valid time is left, the OBE and RSEs in the trust domain may individually reference the distributed CRS and identify the MV-OBE as shown in FIG. 5. However, in some cases, massive CRLs are distributed via a V2X channel or its supplemental channel, causing a data traffic burden. Further, a performance requirement arises that all the OBEs present in the trust domain should process the massive CRLs and discern the messages transmitted from the MV-OBE. Further, the effect may be limited due to the pseudonym certificate for protection of vehicle privacy. The PC may also be denoted a pseudonym certificate.

Figure 6:
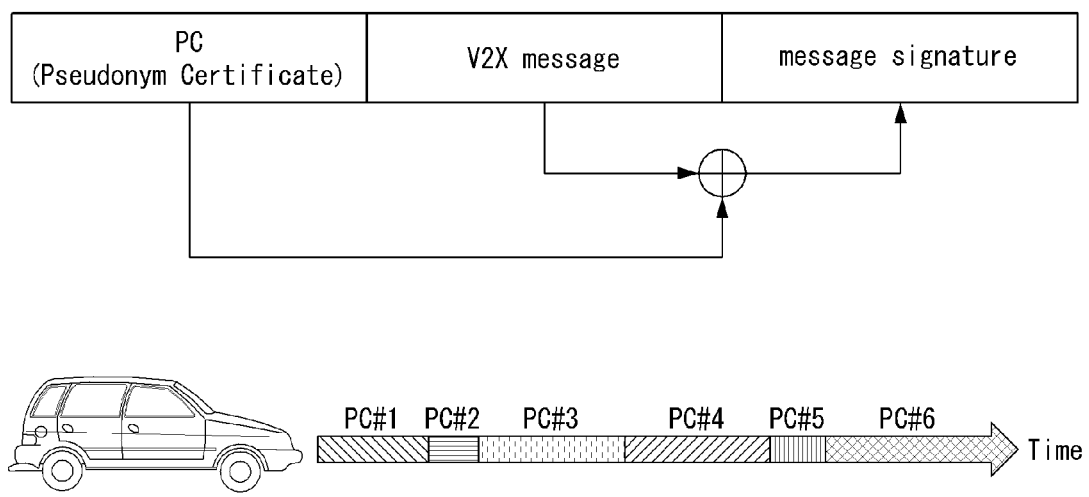
FIG. 6 illustrates use of a pseudonym certificate (PC) according to an embodiment of the disclosure.

FIG. 6 illustrates use of a pseudonym certificate (PC) according to an embodiment of the disclosure.

The PC denotes a certificate issued by the AA to the OBE during the course of authorization of a service or message. Where the OBE attaches a fixed unique certificate (information connected with the identity of the OBE) upon sharing information with the neighbor OBE or RSE via V2X communication, this serves as an easy method capable of tracking the whereabouts and location of the OBE via V2X communication in the vicinity. Thus, for the same service or message authority requested by one OBE, the AA issues a large number of certificates which are not fixed. When the OBE transmits messages on the road, the PCs may be switched randomly and used as shown in FIG. 6. Thus, the neighbor OBE or RSE receiving the message may understand the information carried over the message but has difficulty in recognizing the entity that has sent out the message. Accordingly, the privacy of the OBE transmitting the message is guaranteed. In the disclosure, the PC may be abbreviated as a certificate.

As shown in FIG. 6, the OBE calculates and attaches a message signature to the V2X message to be sent out, using the private key matching the certificate/PC and attaches the corresponding certificate as well. By altering and using the certificate and key in a random pattern (any time, speed, or travel distance), the neighbor OBE has difficulty in continuously tracking the OBE that has transmitted the message.

However, this results in a need for a more complicated mechanism while the OBE or RSEs on the road deal with the MV-OBE based on the CRL. This is a problem with the method of matching the PC, which keeps changing, with the MV-OBE. To that end, there may be required a method of receiving and understanding, via the CRL, the linkage information for matching the OBE identification with the PC when the OBE again receives the PC from the AA or a complicated method of sending a request for the real-time certificate group of the MV-OBE grasped via the CRL at every moment and grasping the same.

The disclosure relates to a method of detecting, in real-time, and handling the MV-OBE during the course of V2X communication. According to the disclosure, there is proposed a method which is well compatible with the above-described MV-OBE detection method based on CRL issuance. In particular, the method prevents a vehicle from being forced to be excluded from the V2X system due to a voluntary measure by recognizing an inevitable misbehaving OBE, such as a simple system error/failure, rather than a malicious OBE which disturbs the system and obtains benefits, and providing a notification therefor.

To that end, the disclosure proposes below a stepwise approach by defining a method for detecting and handling the MV-OBE in three modes. The disclosure proposes a method in which an authorized RSE/OBE sets a locally controlled area to detect the MV-OBE. The disclosure proposes a method in which the authorized RSE/OBE limits use of channel in the controlled area to detect and handle the MV-OBE. The disclosure proposes a method in which, when a potential MV-OBE is detected, the authorized RSE/OBE transmits a warning message directly to the OBE over unicast. The disclosure proposes a method in which the potential MV-OBE responds to the authorized RSE/OBE and handles the same and a method in which the authorized RSE/OBE performs when no response is made.

The legacy MV-OBE handling procedure tends to focus on preventing a malicious vehicle from damaging the system. Accordingly, the present system aims to precisely identify the MV-OBE and thoroughly exclude it from the trust domain. However, all MV-OBEs do not attack the system with a malicious intent. In other words, there also exists misbehavior due to a non-malicious device failure, sensor error/failure. In particular, such occasion may be frequent as the manufactured vehicle is used for a long term, such as a mechanical failure occurring in normal vehicles. Thus, in handling a vehicle meant as the MV-OBE, it is needed to distinguish and separate further detailed/various modes. Table 1 represents modes for discerning the MV-OBE and a method for detecting and determining the same.

TABLE 1

| | mode-1 | mode-2 | mode-3 |
|---|---|---|---|
| decision subject (Decision subject) | neighbor OBE (neighbor OBE) | (multiple) authorized RSEs or OBEs ((multiple) authorized RSE or OBE) | MA or RCA |
| suspicious level (Suspicious level) | possible (possible) | prospective/suspicious (prospective) | confirmed (confirmed) |
| reaction (reaction) | report to authority (Report to authority) | warning and request for clarification (warning and request for clarification) report to authority, if needed (report to authority, if need) | revocation in trust domain (revocation in trust domain) |
| response time (response time) | immediate (immediate) | immediate to relatively short-term (Immediate-relatively short-term) | long-term analysis and distribution (Long-term analysis and distribution) |

As shown in Table 1, modes for handling the MV-OBE may be largely divided into three, and different MV-OBE handling methods are applied depending on the divided modes. The operation of detecting and determining the misbehaving vehicle or the OBE of the misbehaving vehicle may be denoted misbehavior detection & decision (MBD). The modes of handling the MV-OBE may be individually denoted MBD mode-1, MBD mode-2, and MBD mode-3.

In mode 1, the OBE or RSE on the road verifies the message voluntarily transmitted from the neighbor OBE based on its possessed MBD capability. The OBE/RSE may determine the MV-OBE by various methods as described above. However, the accuracy may be decreased under some conditions, such as the limited time due to mobility, dense distribution, or communication environment. The frequent alteration of the PC may also be a cause of disturbing the task of raising the accuracy by continuously tracking the MV-OBE. Or, the OBE verifying the MV-OBE may maliciously generate information. Accordingly, it may be very risky to determine/confirm the MV-OBE based on the information instantaneously gathered.

In mode 3, instantaneous but various pieces of information are gathered, and accurate analysis is performed to thereby determine the MV-OBE. For such a purpose, however, long-term analysis and decision need to be performed per area, OBE, or behavior type according to various scenarios. Thus, the system may not immediately respond to a simple unintentional operation error or failure symptom. Thus, mode 2 is further defined according to the disclosure.

In mode-2, the MBD operation has the following features.

The MBD is performed based on a local area (fixed or varied) on the road.

At least one RSE or OBE which has the MBD operation/inspection authority assigned form the PKI-SMS performs the MBD.

Where the OBE suspicious as the MV-OBE is discovered, the RSE/OBE sends a clarification request message, along with a warning message, to the OBE. The message may be transmitted over unicast but, according to an embodiment, the message may also be transmitted over broadcast or geocast.

The transmitted warning message or clarification request message is transmitted through the packet traffic queue in the highest priority at a lower layer (e.g., in the case of 802.11p-based V2X communication, enhanced distributed channel access (EDCA)) of the transmit end. In the case of ITS-G5, the transmitted warning message or clarification request message may be configured with the highest DCC profile identification (DP-ID) and traffic class.

Where the target OBE does not clearly respond to the transmitted message, the inspecting RSE/OBE may transmit a prospective MV-OBE report to the MA or RCA of the PKI-SMS. Where the target OBE does not clearly respond or where there is no response, it may be interpreted as the suspicious operation lasting.

As shown in Table 1, many MV-OBEs which do not intend to share wrong information may be differentiated as suspicious MV-OBEs in mode-2, and the corresponding OBE itself may quickly recognize that there is a problem and handle the same. Accordingly, the system may block a likelihood of the corresponding OBE to continuously damage the neighbor OBE during the mode-3 process and, after final revocation, avoid the V2X communication authority recovery procedure. In the position of the entire traffic system based on V2X communication, the amount of information of the CRL issued may be significantly reduced, advantageously reducing the network burden.

Figure 7:
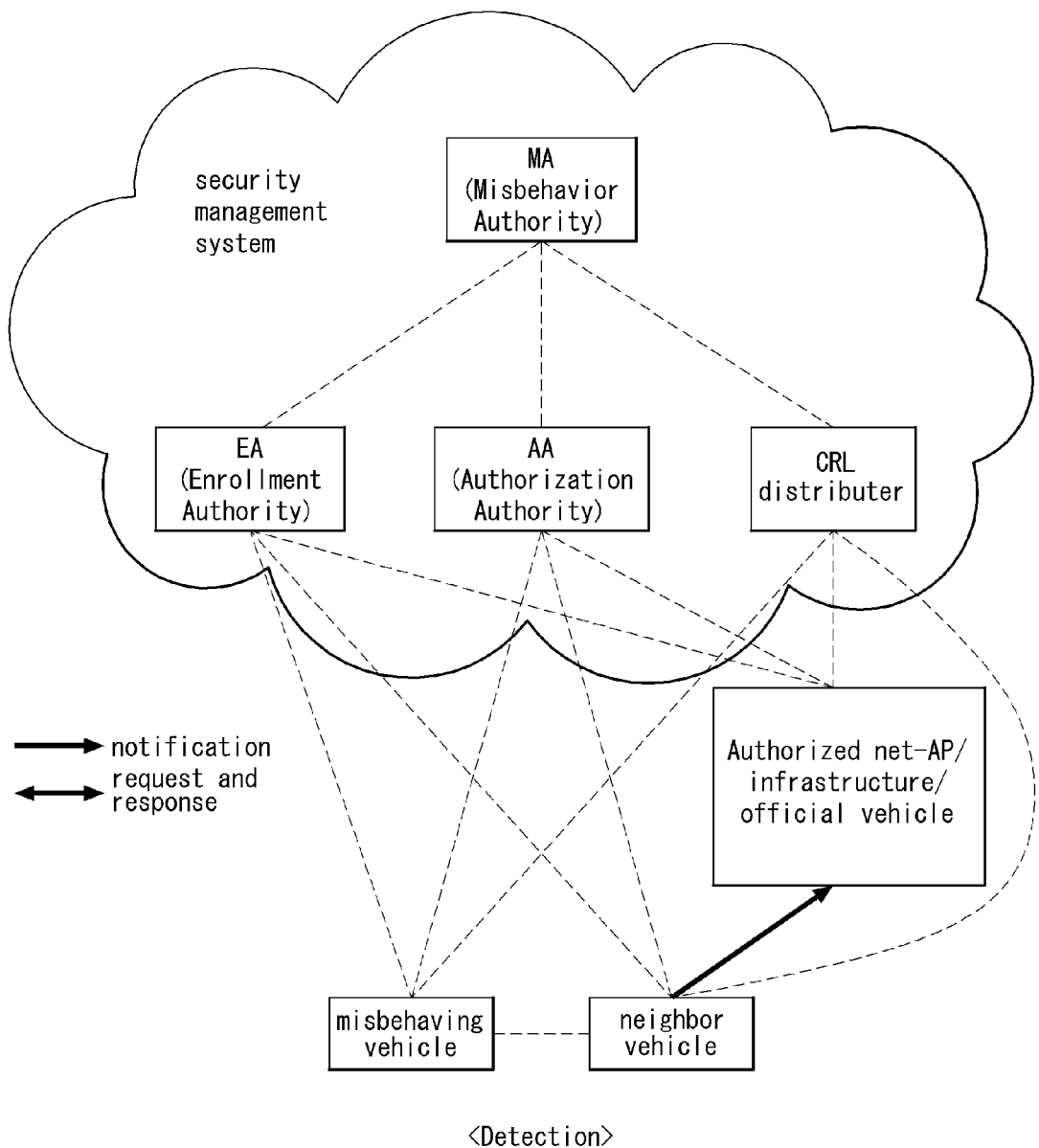
FIG. 7 illustrates an MV-OBE detection method according to an embodiment of the disclosure.
Figure 8:
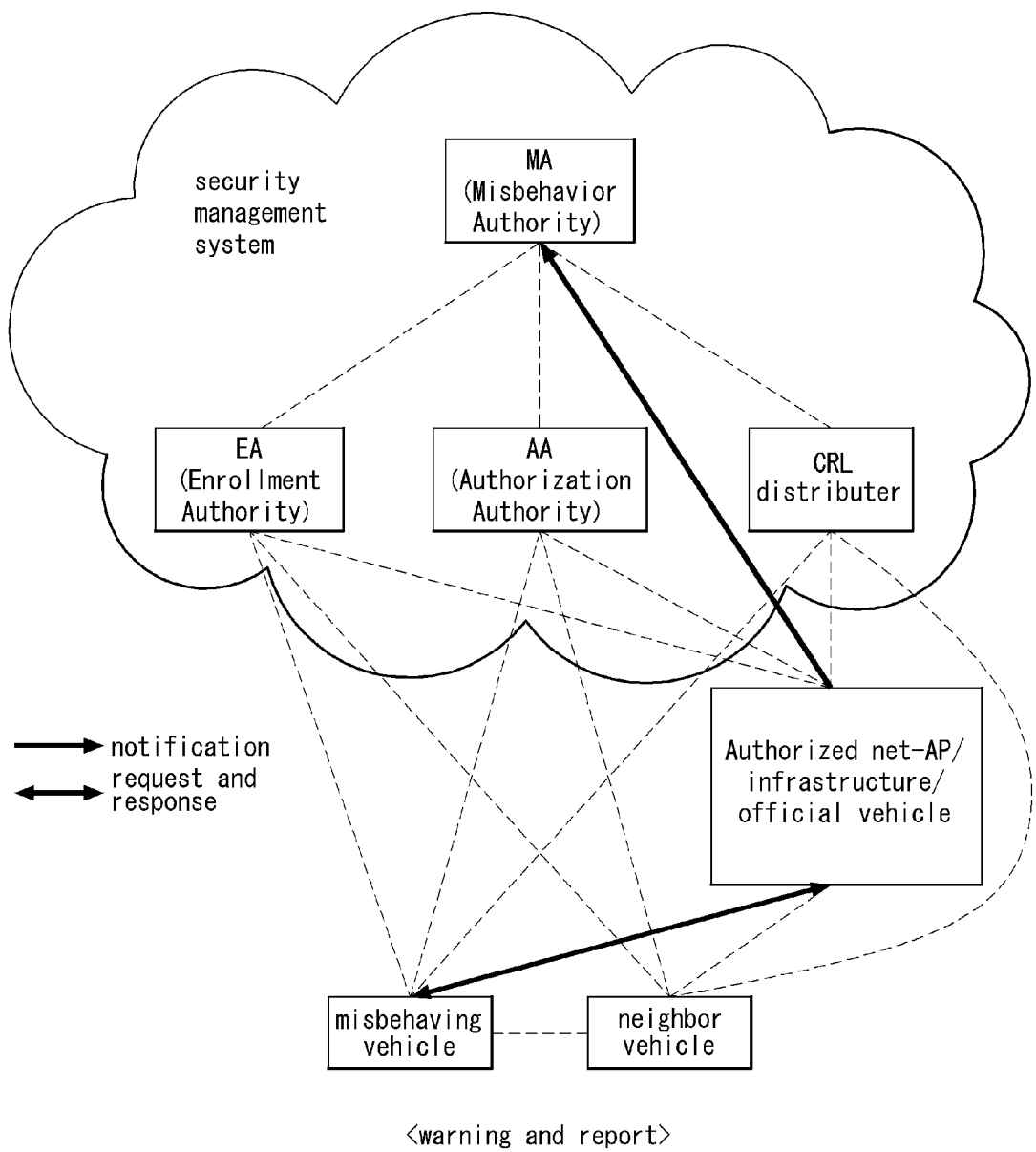
FIG. 8 illustrates a method for warning and reporting an MV-OBE according to an embodiment of the disclosure.

FIGS. 7 and 8 illustrate an MV-OBE processing method according to an embodiment of the disclosure.

FIGS. 7 and 8 illustrate an MV-OBE processing method according to an embodiment of the disclosure, in which the same PKI-SMS is shown for comparison with the PKI-SMS-based MV-OBE processing method of FIGS. 2 to 5. An authenticated infrastructure (NodeB or RSE) or authenticated OBE (official vehicle) receives the authority to inspect the MV-OBE from the PKI-SMS. However, in the embodiment of FIGS. 7 and 8, the process of detecting and warning the MV-OBE may not be performed in interlocking with the PKI-SMS. In the disclosure, authenticated infrastructure or authenticated OBE may be denoted an MV-OBE inspector.

FIG. 7 illustrates an MV-OBE detection method according to an embodiment of the disclosure.

In FIG. 7, the MV-OBE inspector may detect the MV-OBE by using its sensor or receiving an MV-OBE report from the neighbor OBE.

FIG. 8 illustrates a method for warning and reporting an MV-OBE according to an embodiment of the disclosure.

In FIG. 8, the MV-OBE inspector may immediately transmit a warning message to the MV-OBE (suspicious MV-OBE) detected in FIG. 7. The MV-OBE inspector may wait for a response reaction and, unless a proper response is received, report to the PKI-SMS via the MV-OBE.

The detection, warning, and reporting procedure of FIGS. 7 and 8 may be performed in parallel with the method described above in connection with FIGS. 2 to 5 or may be locally distributed and processed. Accordingly, network burden or processing delay may be reduced, and it may be used along with the method of FIGS. 2 to 5.

Figure 9:
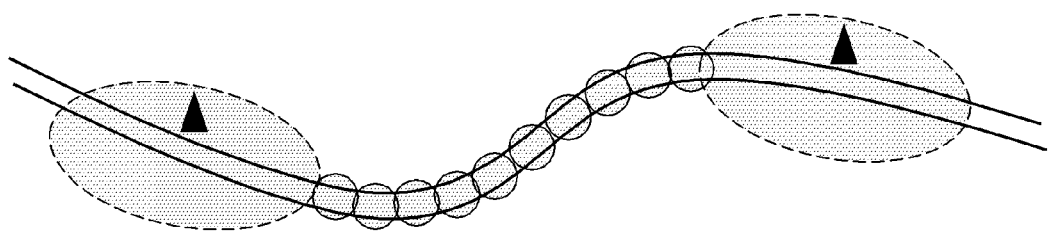
FIG. 9 illustrates a misbehavior inspection zone (MIZ) according to an embodiment of the disclosure.
Figure 9:
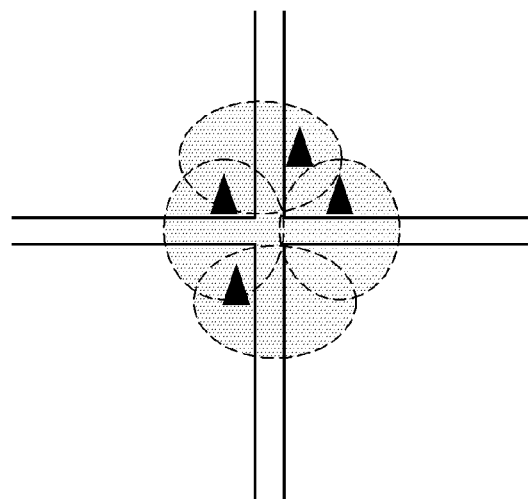

FIG. 9 illustrates a misbehavior inspection zone (MIZ) according to an embodiment of the disclosure.

To perform the MBD processing procedure performed in mode-2, a misbehavior inspection zone (MIZ) may be configured. The misbehavior inspection zone may also be denoted a cooperative inspection zone (CIZ).

Given the mobility and road traffic of the OBE, an MIZ may be configured using various topologies. An MIX may be configured in a specific area under the cooperation among one or more RSEs/OBEs. As a method in which at least one RSE/OBE configures an MIZ, the following three methods may be proposed.

1) An area including one authorized RSE/OBE communication range may become an MIZ.

2) The communication ranges of a plurality of authorized RSEs/OBEs may individually configure the boundaries of an MIZ, and an area including a communication range and on-road area present between the boundaries may become an MIZ.

FIG. 9(a) illustrates an embodiment in which two authorized RSEs/OBEs configure an MIZ. In FIG. 9(a), the communication ranges of two authorized RSEs/OBEs individually become the boundaries of an MIZ, and the communication range and on-road area between the two authorized RSEs/OBEs may become the MIZ.

3) An entire area including the overlapping areas of communication ranges in which beacons or messages are transferred from a plurality of authorized RSEs/OBEs may become an MIZ.

FIG. 9(b) illustrates an embodiment in which four authorized RSEs/OBEs configure an MIZ. In FIG. 9(b), an area including all of the communication ranges of four authorized RSEs/OBEs may become an MIZ.

When one MIZ is configured of a plurality of RSEs/OBEs, these may have the same MIX identification. As a method in which the OBE entering the MIZ may recognize that MBD is performed in mode-2, the following two methods are proposed according to the disclosure.

1) The authorized RSE/OBE in the MIZ transmits a beacon containing information indicating that the zone is the MIZ and relevant additional information (effective range, time, and in-MIZ V2X communication-related control information). Further, the beacon may include an (authority) authorization certificate proving the authority issued from the PKI-SMS which has been permitted for the authority for mode-2 operation.

2) The authorized RSE/OBE may transmit MIZ-related information only when the OBE is suspicious as the MV-OBE, instead of transmitting the MIZ-related information via periodic beacons. In other words, the authorized RSE/OBE normally transmits no beacon and, when the OBE is suspicious as the MV-OBE, transmits a suspicious MV-OBE warning message or clarification request message. The warning message or clarification request message may include the information indicating the MIZ and related additional information (area range, effective time, etc.). The warning message or clarification request message may include an (authority) authorization certificate proving the authority issued from the PKI-SMS which has been permitted for the authority for mode-2 operation. The warning message and clarification request message may collectively be referred to as a warning message.

As described above, the authorized RSE/OBE may transmit V2X communication-related control information, as well as the MIZ notification, upon transmitting the beacon. However, unlike in the typical V2X communication principle, this may be operated by centralized control of network congestion. The authorized RSE/OBE may control the channel access authority within the local range and forbid message transmission according to each OBE's own congestion control. The message transmission control/channel use control of the authorized RSE/OBE may be performed by the following two methods. However, the V2X communication control information described below may not limit the operation of the OBE designated as a candidate MV-OBE.

1) The OBEs in the MIZ do not perform congestion control operation according to the channel busy ratio (CBR) obtained via reception of a message or measured by their respective physical layers. Instead, a message is transmitted based on the information in the CBR contained in the beacon transmitted from the authorized RSE/OBE. For example, although the CBR measured/obtained by the OBE is determined to be in the range of a relaxed channel state, if the CBR received via the MIZ beacon indicates a restrictive channel state, the OBE adjusts the message transmission parameters (transmission period and transmission power) based on the restrictive channel state.

2) The authorized RSE/OBE may transmit a channel use mute, along with the effective time, in the beacon containing the MIZ information. The OBEs in the MIZ, receiving the effective time information and information indicating the channel use mute stop message transmission for the corresponding time.

Where it is indicated using the beacon that the corresponding area is the MIZ, such advantage may be obtained that the neighbor OBEs may also recognize the MIZ and the MV-OBE-related reports transmitted from the neighbor OBEs may be additionally used. Further, as needed, access to the candidate MV-OBE may be facilitated by controlling the V2X communication in the OBEs in the MIZ for detecting the MV-OBE. However, a malicious MV-OBE may recognize its entry to the MIZ and attempt to avoid detection by intentionally pretending to normally operate. The warning message or clarification request message may include the certificate/PC of the candidate MV-OBE gathered in the MIZ. Thus, it is possible to clarify the target of reception of the warning/clarification request message.

The authorized RSE/OBE may detect the candidate OBE by using the received report and the information obtained from its own sensor and transmit a workflow manager or clarification request message directly to the OBE. Such messages may include restrictive time information and candidate MV-OBE type information in the response. The candidate MV-OBE type information may be classified as in Table 2 below.

TABLE 2

| MBD type | MBD category (MBD Category) | detection mechanism (detection Mechanism) |
| --- | --- | --- |
| MBD type-1 | beacon error/failure (False Beacon) | location mismatch with MAP (Location mismatch with MAP) invalid range on vehicle trajectory (Invalid range on vehicle trajectory) |
| MBD type-2 | false warning (False Warning) | implausibility on event report (Implausibility on event report) |

TABLE 2-continued

| MBD type | MBD category (MBD Category) | detection mechanism (detection Mechanism) |
| --- | --- | --- |
| MBD type-3 | bad reputation (Bad reputation) | misbehavior ballot based on reports from other vehicles (Misbehavior ballot based on reports from other vehicles) |

In Table 2, beacon error/failure means that the candidate MV-OBE reports wrong location information for it. In other words, beacon error/failure means that the candidate MV-OBE is providing driving information different from the location information on the map or a discontinuous operation is performed, such as when the location shared on the message abruptly appears and then disappears. Warning error/failure (false warning) means that the candidate MV-OBE is providing wrong recognition information for the ambient context. In other words, warning error/failure (false warning) denotes the case where the candidate MV-OBE provides information indicating that there is a lane closure even when there is not or provides information indicating that there is an emergency although there is no emergency/sudden brake. Bad reputation means that such a report is transmitted where neighbor OBEs for the MV-OBE take a suspicious action. MBD types may be further divided and defined as needed, and the MBD type information may be transmitted to the candidate MV-OBE to notify the candidate MV-OBE that the candidate MV-OBE may recognize a problem that it may not recognize.

The OBE designated as the candidate MV-OBE from the authorized RSE/OBE needs to send a response within the MIZ range within a limited time. The following two methods are proposed for the candidate MV-OBE to send out a response.

1) The candidate MV-OBE may transmit a response message over unicast. The response message may include at least one of OBE identification information for identifying the same, other than the PC, handling expected time information, and handling method information.

2) The candidate MV-OBE may add acknowledge information/bit for the received warning message to the header of the message and transmit the message over broadcast. This represents that, when an immediate reaction is limited, being designated as the candidate MV-OBE is recognized, and it is accordingly handled. Such ACK/recognition information may be denoted warning recognition information.

According to an embodiment, the OBE identity for identifying the OBE, other than the PC, may be an ID assigned for the MBD application upon performing service or message (authority) authorization from the AA. This ID is a unique ID present within a reissue period only for the MBD application. This ID may be an ID that is not relatively frequently changed.

The method for the candidate MV-OBE to insert an ACK bit to the message header shared with the neighbor OBE may advantageously allow the OBE to easily react to the warning. That is, this may present the advantage that in the context where it is difficult to faithfully respond, such as in an emergency, the OBE may easily and immediately react. However, this may be maliciously used. Accordingly, it gives the burden that the authorized RSE/OBE needs to record responses and continuously track in collaboration with the RCA/MA. Thus, according to an embodiment, where the OBE inserts an ACK bit to the message header and responds, the OBE may stop changing the PC after responding. In this case, a privacy issue may occur. However, the neighbor OBE and the authorized RSE/OBE may easily verify the operation of the MV-OBE.

Figure 10:
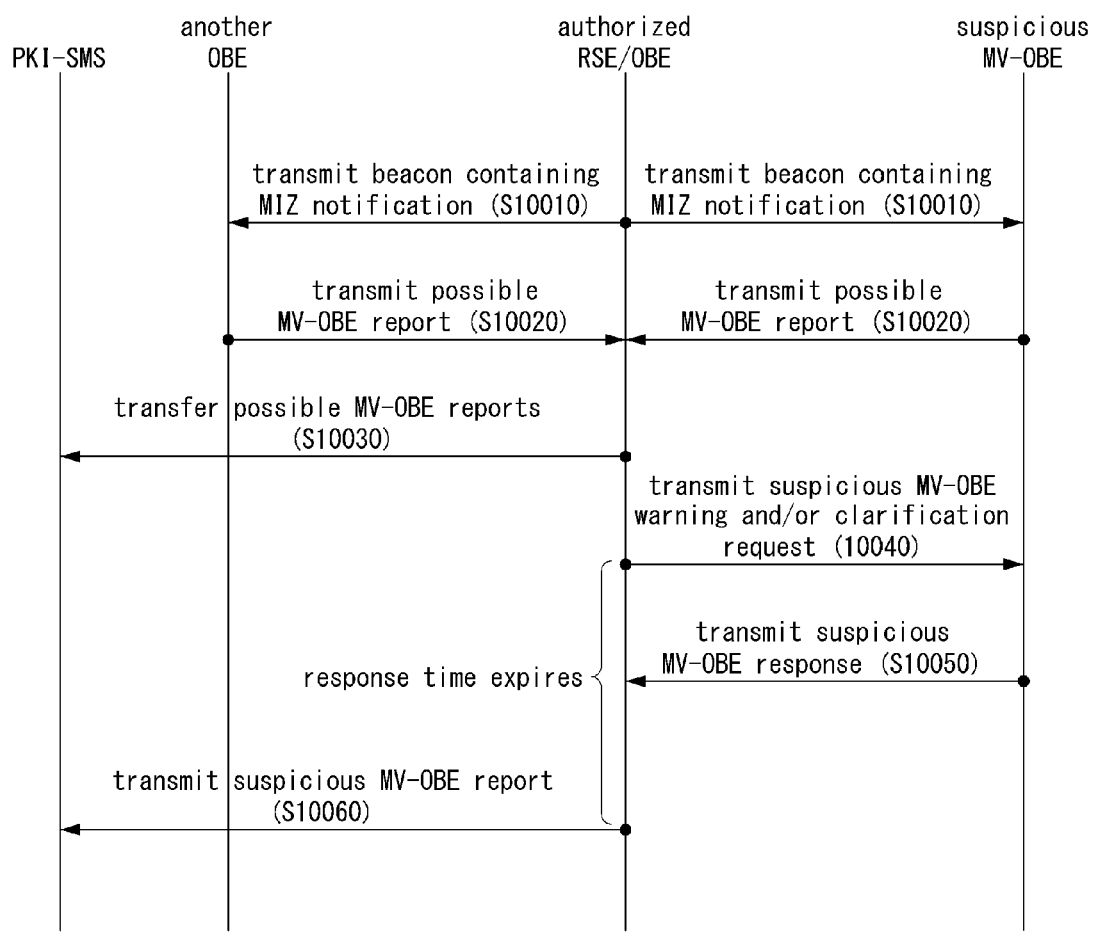
FIG. 10 illustrates a message flow for an MIZ-based suspicious MV-OBE detection process according to an embodiment of the disclosure.

FIG. 10 illustrates a message flow for an MIZ-based suspicious MV-OBE detection process according to an embodiment of the disclosure.

FIG. 10 illustrates an MV-OBE detection method using a beacon message.

The authorized RSE/OBE transmits a beacon containing an MIZ notification (S10010). The authorized RSE/OBE given an MBD authority from the PKI-SMS transmits beacon signals around, thereby indicating that the authorized RSE/OBE is present. The MIZ notification-related information contained in the beacon may include at least one of the following information.

MBD permission/certification information: The MBD permission information or MBD certification information is information to prove that an MBD authority has been given. This information may also be denoted MBD authority permission information or MBD authority certification information. This may also be represented in the form of a bit mask in the service certificate. The OBEs receiving the beacons may verify the information and then recognize that the authorized RSE/OBE for MBD operates. Further, by authenticating the MBD permission/certification information, the OBEs may trust the authorized RSE/OBE.

MIZ identification/ID information. The MIZ identification information is an MIZ identity and identifies the RSE/OBEs constituting one MIZ. This is a group ID meaning that the RSEs/OBEs having the same MIZ-ID share MB/OBE detection information and cooperate for the MBD operation. In the case of two RSEs having the same MIZ-ID, the MV-OBE information detected by the first RSE may be shared with the second RSE, and the second RSE may perform the subsequent handling.

Member group information: The member group information indicates the location of the authorized RSE/OBE having the same MIZ ID. That is, the member group information indicates the location information of authorized RSEs/OBEs having the same MIZ ID. The member group information may also be denoted member location information. The OBEs receiving the beacons may perform an MV-OBE report or candidate MV-OBE response based on the member location information.

V2X communication control information: The V2X communication control information is information to provide the V2X communication parameters of the OBEs present in the MIZ. The V2X communication control information may restrict the V2X communication of the OBEs in the MIZ. As described above, the OBE in the MIZ may adjust the transmission parameters, such as transmission period and transmission power, based on the communication parameters provided by the received V2X communication control information. The OBE in the MIZ may apply the received V2X communication parameter earlier than self-operating decentralized congestion control (DCC).

Activity valid time information: The activity valid time information indicates the limited time when the authorized RSE/OBE performs the MBD operation. However, the activity valid time differs from the valid time displayed on the MBD permission/certificate. The activity valid time denotes a limit to the time when the MBD is currently being performed, and the valid time on the MBD permission/certificate denotes the valid time of service permission related to MBD activity. Accordingly, the activity valid time may be equal to or smaller than the valid time on the MBD permission.

The OBE receiving the beacon transmits a report for a possible MV-OBE (S10020). All OBEs performing MBD mode-1 recognize the authorized RSE/OBE by receiving the MIZ notification-containing beacons and transmit a report for a possible MV-OBE to the recognized RSE/OBE. The report for the suspicious/possible MV-OBE may include at least one of the following information.

In the disclosure, certificate may be denoted certificate information, identity, identification, or identification information. The identity may correspond to at least one of a certificate, PC, or identity issued from the application layer.

Suspicious MV-OBE certificate: This is an identity for the security module to recognize the suspicious OBE. By the above-described nature of the PC, although keeping changing, the PKI-SMS which has issued the certificate may extract the unique identity of the suspicious OBE by sharing information with the RA and AA, analyze the final MV-OBE, and revoke.

Reporter certificate: This is an identity of the OBE reporting the suspicious OBE. The reporter certificate guarantees the data integrity of the MV-OBE report and the authenticity of the reporter. Although continuing to change by the nature of the PC, the PKI-SMS which has issued the certificate may extract the unique identity of the OBE by sharing information with the EA and AA. This information may also be used to analyze the MV-OBE pretending the reporter.

MV-OBE type information: This indicates the reason why it is determined to be a suspicious MV-OBE, and the PKI-SMS may analyze the MV-OBE using the information. According to an embodiment, the type information may be classified/defined as shown in Table 2.

The authorized RSE/OBE receiving the reports may compile the reports and transfer the same to the PKI-SMS (S10030). This is performed for MBD mode-3. The compiled reports may be delivered via the backbone network of the authorized RSE/OBE.

The authorized RSE/OBE may transmit a prospective MV-OBE warning and/or clarification request (S10040). The authorized RSE/OBE may detect the suspicious MV-OBE via its own detection method and transmit the suspicious MV-OBE warning message and/or clarification request message to the OBE. The warning message and/or clarification request message may be transmitted as a single message or as multiple messages. The information included in the warning message may include at least one of the following information.

Target OBE identification information: The target OBE identification information denotes a specific receiving OBE for unicast transmission, i.e., identification information of the suspicious MV-OBE. The target OBE identity may be a certificate of the message currently transmitted around by the suspicious MV-OBE. The receiving OBE may identify whether the certificate is the certificate that it has recently used or it is currently using and identify that it has been designated as a suspicious MV-OBE.

MV-OBE type information: The MV-OBE type information denotes the reason why it is determined to be the suspicious MV-OBE. The receiving OBE receiving the warning message may recognize its problem via this information and seek a response. Seeking a response to the problem may be varied depending on the self-diagnostic scenario owned by the OBE. For example, in the case of a sensor fault, the OBE may disable the whole or part of the V2X service based on the sensor. According to an embodiment, the type information may be classified/defined as shown in Table 2.

Response valid time information: The response valid time information may be a limited time which is counted from the time when the authorized RSE/OBE transmits a suspicious MV-OBE warning message and until it receives a response from the OBE designated as the suspicious MV-OBE. The response valid time information is a time when the authorized RSE/OBE waits for a response from the suspicious MV-OBE and, if this time passes, the authorized RSE/OBE may start a subsequent measure to the suspicious MV-OBE. The authorized RSE/OBE may determine whether a response arrives before the expiration time and the content of the response message and perform a subsequent measure.

The suspicious MV-OBE may transmit a response (S10050). That is, the authorized RSE/OBE may receive a response from the suspicious MV-OBE before the response time expires. The response may be transmitted over unicast or broadcast. In each case, the message may include the following information.

In the case of a unicast response, the response message may include at least one of the following information.

OBE identification information: The authorized RSE/OBE may transmit its identification information to be able to trust the sender of the response message. The identification information may correspond to a certificate. According to an embodiment, the suspicious MV-OBE may maintain, without changing, the PC until it is released from the suspicious MV-OBE.

Handling type information: This is information for the OBE to clarify a method for handling the detected problem. For example, the handling type information may indicate a handling method corresponding to, e.g., disablement of the problematic sensor, pause of transmission of the related V2X message, or pause of OBE operation.

Handling time information: This may indicate the time expected to handle the problem. As the OBE designates the time expected to handle the problem, the time information may be used for the authorized RSE/OBE to track the results of handling the suspicious MV-OBE in the future. For example, where the same issue is detected from the OBE even after the handling time, the authorized RSE/OBE may determine that the OBE is a malicious MV-OBE and report this to the PKI-SMS.

In the case of a broadcast response, the response message may include ACK information.

The ACK information means that the suspicious MV-OBE has received a warning/clarification message, recognized the issue, and is to take a subsequent measure. If the authorized RSE/OBE is responded to with an ACK, the authorized RSE/OBE may determine that the suspicious OBE is not a malicious OBE. As described above, the ACK information may be inserted to the normal message being currently transmitted by the OBE by the nature of the simple field and be quickly responded to. The ACK information may correspond to the above-described warning recognition information.

Where no response is transmitted from the suspicious MV-OBE within the valid response time or a response message contains invalid content, the authorized RSE/OBE may transmit a suspicious MV-OBE report to the PKI-SMS (S10060). The report may include the same information as the necessary information included in the above-described possible MV-OBE report. However, since the reporter certificate includes the permission information of the authorized RSE/OBE, it may be distinguished from the possible MV-OBE report. The suspicious MV-OBE report message may include at least one of the following information.

Suspicious MV-OBE certificate: This is an identity for the security module to recognize the suspicious OBE. By the above-described nature of the PC, although keeping changing, the PKI-SMS which has issued the certificate may extract the unique identity of the suspicious OBE by sharing information with the EA and AA, analyze the final MV-OBE, and revoke.

Reporter certificate: This is an identity of the authorized RSE/OBE reporting the suspicious OBE. The reporter certificate guarantees the data integrity of the MV-OBE report and the authenticity of the reporter. Unlike the PC of the OBE, this information may not be altered.

MV-OBE type information: This indicates the reason why it is determined to be a suspicious MV-OBE, and the PKI-SMS may analyze the MV-OBE using the information. According to an embodiment, the type information may be classified/defined as shown in Table 2.

Figure 11:
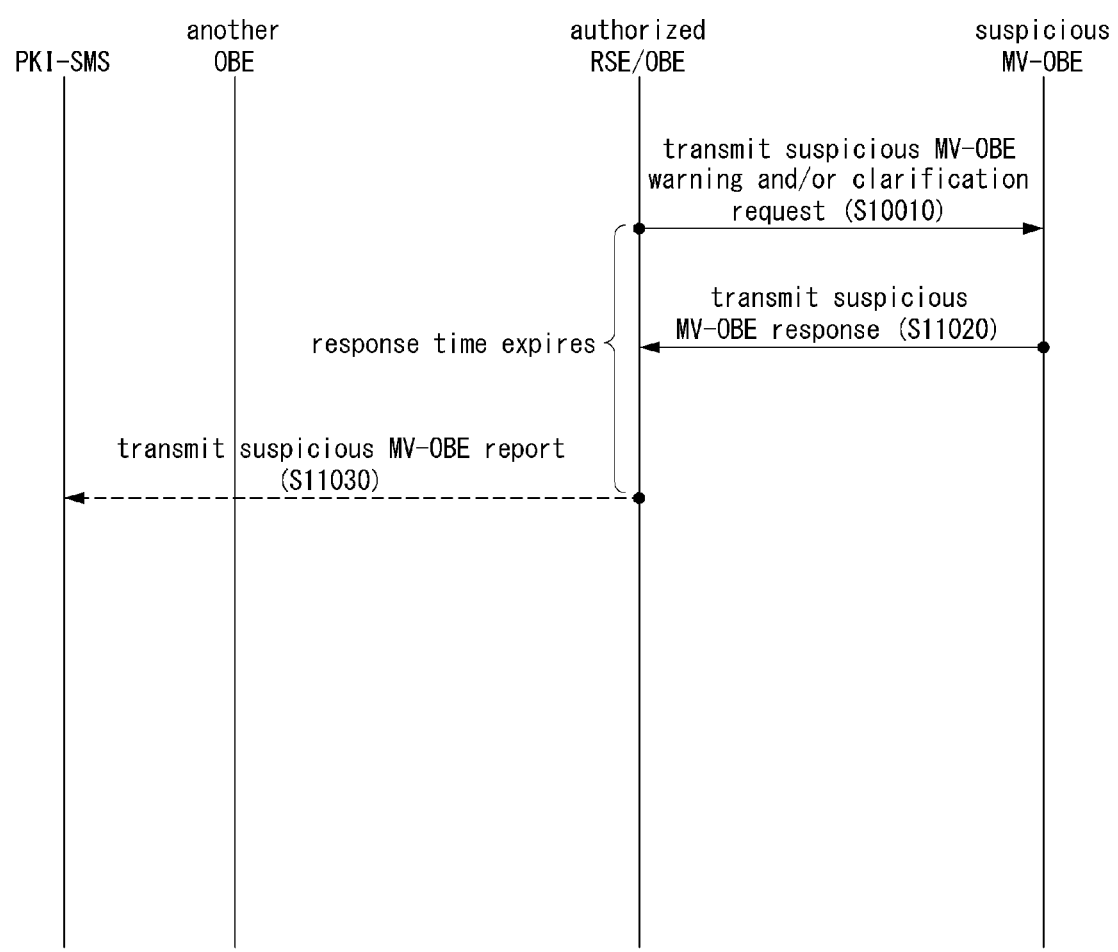
FIG. 11 illustrates a message flow for an MIZ-based suspicious MV-OBE detection process according to another embodiment of the disclosure.

FIG. 11 illustrates a message flow for an MIZ-based suspicious MV-OBE detection process according to another embodiment of the disclosure.

FIG. 11 illustrates an MV-OBE detection method that does not use a beacon message.

The authorized RSE/OBE may transmit a warning/clarification request message to the suspicious MV-OBE. The authorized RSE/OBE may transmit a prospective MV-OBE warning and/or clarification request to the suspicious MV-OBE (S11010). The authorized RSE/OBE may detect the suspicious MV-OBE via its own detection method and transmit the suspicious MV-OBE warning message and/or clarification request message to the OBE. The warning message and/or clarification request message may be transmitted as a single message or as multiple messages. The information included in the warning message may include at least one of the following information.

Target OBE identification information: The target OBE identification information denotes a specific receiving OBE for unicast transmission, i.e., identification information of the suspicious MV-OBE. The target OBE identity may be a certificate of the message currently transmitted around by the suspicious MV-OBE. The receiving OBE may identify whether the certificate is the certificate that it has recently used or it is currently using and identify that it has been designated as a suspicious MV-OBE.

MV-OBE type information: The MV-OBE type information denotes the reason why it is determined to be the suspicious MV-OBE. The receiving OBE receiving the warning message may recognize its problem via this information and seek a response. Seeking a response to the problem may be varied depending on the self-diagnostic scenario owned by the OBE. For example, in the case of a sensor fault, the OBE may disable the whole or part of the V2X service based on the sensor. According to an embodiment, the type information may be classified/defined as shown in Table 2.

Response valid time information: The response valid time information may be a limited time which is counted from the time when the authorized RSE/OBE transmits a suspicious MV-OBE warning message and until it receives a response from the OBE designated as the suspicious MV-OBE. The response valid time information is a time when the authorized RSE/OBE waits for a response from the suspicious MV-OBE and, if this time passes, the authorized RSE/OBE may start a subsequent measure to the suspicious MV-OBE. The authorized RSE/OBE may determine whether a response arrives before the expiration time and the content of the response message and perform a subsequent measure.

MBD permission/certification information: The MBD permission information or MBD certification information is information to prove that an MBD authority has been given. This information may also be denoted MBD authority permission information or MBD authority certification information. This may also be represented in the form of a bit mask in the service certificate. The OBEs receiving the beacons may verify the information and then recognize that the authorized RSE/OBE for MBD operates. Further, by authenticating the MBD permission/certification information, the OBEs may trust the authorized RSE/OBE.

MIZ identification/ID information. The MIZ identification information is an MIZ identity and identifies the RSE/OBEs constituting one MIZ. This is a group ID meaning that the RSEs/OBEs having the same MIZ-ID share MB/OBE detection information and cooperate for the MBD operation. In the case of two RSEs having the same MIZ-ID, the MV-OBE information detected by one RSE may be shared with the other RSE, and the other RSE may perform the subsequent handling.

Member group information: The member group information indicates the location of the authorized RSE/OBE having the same MIZ ID. That is, the member group information indicates the location information of authorized RSEs/OBEs having the same MIZ ID. The member group information may also be denoted member location information. The OBEs receiving the beacons may perform an MV-OBE report or candidate MV-OBE response based on the member location information.

The suspicious MV-OBE may transmit a response (S11020). That is, the authorized RSE/OBE may receive a response from the suspicious MV-OBE before the response time expires. The response may be transmitted over unicast or broadcast. In each case, the message may include the following information.

In the case of a unicast response, the response message may include at least one of the following information.

OBE identification information: The authorized RSE/OBE may transmit its identification information to be able to trust the sender of the response message. The identification information may correspond to a certificate. According to an embodiment, the suspicious MV-OBE may maintain, without changing, the PC until it is released from the suspicious MV-OBE.

Handling type information: This is information for the OBE to clarify a method for handling the detected problem. For example, the handling type information may indicate a handling method corresponding to, e.g., disablement of the problematic sensor, pause of transmission of the related V2X message, or pause of OBE operation.

Handling time information: This may indicate the time expected to handle the problem. As the OBE designates the time expected to handle the problem, the time information may be used for the authorized RSE/OBE to track the results of handling the suspicious MV-OBE in the future. For example, where the same issue is detected from the OBE even after the handling time, the authorized RSE/OBE may determine that the OBE is a malicious MV-OBE and report this to the PKI-SMS.

In the case of a broadcast response, the response message may include ACK information.

The ACK information means that the suspicious MV-OBE has received a warning/clarification message, recognized the issue, and is to take a subsequent measure. If the authorized RSE/OBE is responded to with an ACK, the authorized RSE/OBE may determine that the suspicious OBE is not a malicious OBE. As described above, the ACK information may be inserted to the normal message being currently transmitted by the OBE by the nature of the simple field and be quickly responded to. The ACK information may correspond to the above-described warning recognition information.

Where no response is transmitted from the suspicious MV-OBE within the valid response time or a response message contains invalid content, the authorized RSE/OBE may transmit a suspicious MV-OBE report to the PKI-SMS (S11030). The report may include the same information as the necessary information included in the above-described possible MV-OBE report. However, since the reporter certificate includes the permission information of the authorized RSE/OBE, it may be distinguished from the possible MV-OBE report. The suspicious MV-OBE report message may include at least one of the following information.

Suspicious MV-OBE certificate: This is an identity for the security module to recognize the suspicious OBE. By the above-described nature of the PC, although keeping changing, the PKI-SMS which has issued the certificate may extract the unique identity of the suspicious OBE by sharing information with the EA and AA, analyze the final MV-OBE, and revoke.

Reporter certificate: This is an identity of the authorized RSE/OBE reporting the suspicious OBE. The reporter certificate guarantees the data integrity of the MV-OBE report and the authenticity of the reporter. Unlike the PC of the OBE, this information may not be altered.

MV-OBE type information: This indicates the reason why it is determined to be a suspicious MV-OBE, and the PKI-SMS may analyze the MV-OBE using the information. According to an embodiment, the type information may be classified/defined as shown in Table 2.

Figure 12:
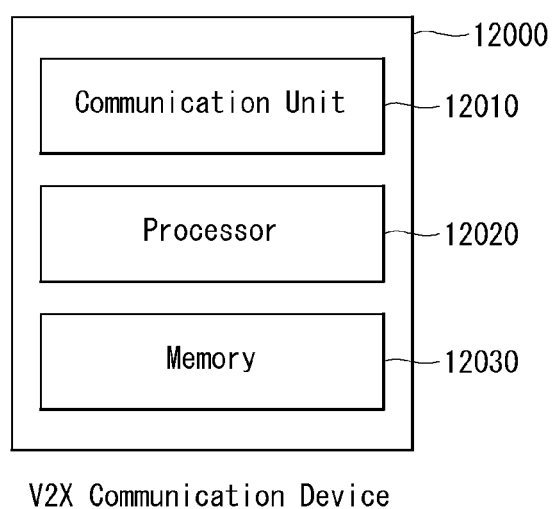
FIG. 12 illustrates a V2X communication device according to an embodiment of the disclosure.

FIG. 12 illustrates a V2X communication device according to an embodiment of the disclosure.

Referring to FIG. 12, a V2X communication device 12000 may include a communication unit 12010, a processor 12020, and a memory 12030. The V2X communication device may correspond to an on board unit (OBE)/on board equipment (OBE) or road side unit (RSU)/road side equipment (RSE) or may be included in an OBU or RSU. The V2X communication device may be included in an intelligent transport system (ITS) station or may correspond to an ITS station.

The communication unit 12010 may be connected with the processor to transmit/receive wireless signals. The communication unit may up-convert data received from the processor into a transmission/reception band and transmit the signal. The communication unit may down-convert a received signal and transfer the signal to the processor. The communication unit may implement the operation of the access layer. According to an embodiment, the communication unit may implement the operation of the physical layer included in the access layer or may additionally implement the operation of the MAC layer. The communication unit may also include a plurality of sub communication units to perform communication according to a plurality of communication protocols. According to an embodiment, the communication unit may perform communication based on 802.11, WAVE (Wireless Access in Vehicular Environments), DSRC (Dedicated Short Range Communications), 4G (LTE, Long-Term Evolution), 5G (NR, New Radio), or other various AD-HOC communication protocols, WLAN (Wireless Local Area Network) communication protocols or cellular communication protocols. To perform communication based on a plurality of communication protocols, the communication unit may include a plurality of antennas or a plurality of sub communication units. For example, the communication unit may include a first sub communication unit performing 802.11-based communication and a second sub communication unit performing cellular-based communication.

The processor 12020 may be connected with the communication unit to implement the operation of the layers according to the ITS system or WAVE system. The processor may be configured to perform operations according to various embodiments of the disclosure as described with reference to the drawings. Further, according to various embodiments of the disclosure, at least one of a module, data, program, or software for implementing the operation of the V2X communication device may be stored in the memory and be executed by the processor.

The memory 12030 is connected with the processor and stores various pieces of information for driving the processor. The memory may be included in the processor or be installed outside the processor and connected with the processor via a known means. The memory may include a secure/non-secure storage device or be included in a secure/non-secure storage device. According to an embodiment, the memory may be denoted a secure/non-secure storage device.

The specific configuration of the V2X communication device of FIG. 12 may be implemented so that various embodiments of the disclosure are applied independently from each other or two or more thereof are applied together.

The V2X communication device may perform the above-described misbehaving OBE detection method.

A method for detecting a misbehaving on-board equipment (OBE) by a vehicle-to-everything (V2X) communication device may comprise transmitting a beacon including misbehavior inspection zone (MIZ)-related information, the MIZ being a misbehavior inspection zone in which at least one authorized road side equipment (RSE)/OBE detects a misbehaving vehicle (MV)-OBE, and the V2X communication device corresponding to an OBE or RSE authorized for a misbehavior detection (MBD) operation, receiving a report for a possible MV-OBE, transmitting a warning message to a suspicious MV-OBE, and based on receiving, or failing to receive, a message responsive to the warning message from the suspicious MV-OBE within a response valid time, transmitting a report for the suspicious MV-OBE to a security system.

According to an embodiment of the disclosure, in the method for detecting the misbehaving OBE by the V2X communication device, the beacon may include at least one of MBD authorization information, MIZ identity information, member group information, V2X communication control information, or activity valid time information. The MBD authorization information may prove that the V2X communication device has an MBD authority, the MIZ identity information may identify at least one RSE/OBE constituting one MIZ, the member group information may indicate a location of the at least one RSE/OBE having the same MIZ identity, the V2X communication control information may provide V2X communication parameters of OBEs in the MIZ, and the activity valid time information may indicate a limited time during which the authorized RSE/OBE performs an MBD operation.

According to an embodiment of the disclosure, in the method for detecting the misbehaving OBE by the V2X communication device, the report for the possible MV-OBE may include at least one of suspicious MV-OBE identity information, reporter identity information, or MV-OBE type information. The suspicious MV-OBE identity information may be a certificate for identifying the suspicious MV-OBE, the reporter identity information may be a certificate for identifying an OBE transmitting the report for the MV-OBE, and the MV-OBE type information may indicate a reason why a report target OBE is determined to be the suspicious MV-OBE.

According to an embodiment of the disclosure, in the method for detecting the misbehaving OBE by the V2X communication device, the warning message may include at least one of target OBE identity information, MV-OBE type information, or response valid time information. The target OBE identity information may be a certificate for identifying the suspicious MV-OBE, the MV-OBE type information may indicate a reason why an OBE receiving the warning message is determined to be the suspicious MV-OBE, and the response valid time information may indicate the response valid time when reception of a response to the warning message from the suspicious MV-OBE is awaited.

According to an embodiment of the disclosure, in the method for detecting the misbehaving OBE by the V2X communication device, the response message may include at least one of OBE identity information, handling type information, handling time information, or ACK information. The OBE identity information may be a certificate for identifying the suspicious MV-OBE, the handling type information may be information for clarifying handling for a detected misbehavior issue, the handling time information may be information designating a time expected to handle the detected misbehavior issue, and the ACK information may indicate an acknowledgement and response to the warning message.

According to an embodiment of the disclosure, in the method for detecting the misbehaving OBE by the V2X communication device, the report for the suspicious MV-OBE may include at least one of the suspicious MV-OBE identity information, reporter identity information, or MV-OBE type information. The suspicious MV-OBE identity information may be a certificate for identifying the suspicious MV-OBE, the reporter identity information may be a certificate for identifying the V2X communication device transmitting the report for the MV-OBE, and the MV-OBE type information may indicate a reason why a report target OBE is determined to be the suspicious MV-OBE.

According to an embodiment of the disclosure, in the method for detecting the misbehaving OBE by the V2X communication device, the response message may be received over unicast or broadcast.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of an embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the disclosure may be implemented by various means, for example, hardware, firmware, software or a combination of them. In the case of implementations by hardware, an embodiment of the disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the disclosure may be materialized in other specific forms without departing from the essential characteristics of the disclosure. Accordingly, the detailed description should not be construed as being limitative from all aspects, but should be construed as being illustrative. The scope of the disclosure should be determined by reasonable analysis of the attached claims, and all changes within the equivalent range of the disclosure are included in the scope of the disclosure.

DETAILED DESCRIPTION OF EXEMPLARY EMBODIMENTS

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The disclosure sets forth both devices and methods, and descriptions thereof may be complementarily applicable to each other.

Various embodiments have been described in the best mode for practicing the disclosure.

INDUSTRIAL AVAILABILITY

The disclosure is used in a series of vehicle communication fields.

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

What is claimed is:

1. A method for detecting a misbehaving on-board equipment (OBE) by a vehicle-to-everything (V2X) communication device, the method comprising:
transmitting a beacon including misbehavior inspection zone (MIZ)-related information, the MIZ being a misbehavior inspection zone in which at least one authorized road side equipment (RSE)/OBE detects a misbehaving vehicle (MV)-OBE, and the V2X communication device corresponding to an OBE or RSE authorized for a misbehavior detection (MBD) operation;
receiving a report for a possible MV-OBE;
transmitting a warning message to a suspicious MV-OBE; and based on receiving, or failing to receive, a message responsive to the warning message from the suspicious MV-OBE within a response valid time, transmitting a report for the suspicious MV-OBE to a security system.

2. The method of claim 1, wherein
the beacon includes at least one of MBD authorization information, MIZ identity information, member group information, V2X communication control information, or activity valid time information, and wherein
the MBD authorization information proves that the V2X communication device has an MBD authority, the MIZ identity information identifies at least one RSE/OBE constituting one MIZ, the member group information indicates a location of the at least one RSE/OBE having the same MIZ identity, the V2X communication control information provides V2X communication parameters of OBEs in the MIZ, and the activity valid time information indicates a limited time during which the authorized RSE/OBE performs an MBD operation.

3. The method of claim 1, wherein
the report for the possible MV-OBE includes at least one of suspicious MV-OBE identity information, reporter identity information, or MV-OBE type information, and wherein
the suspicious MV-OBE identity information is a certificate for identifying the suspicious MV-OBE, the reporter identity information is a certificate for identifying an OBE transmitting the report for the MV-OBE, and the MV-OBE type information indicates a reason why a report target OBE is determined to be the suspicious MV-OBE.

4. The method of claim 1, wherein
the warning message includes at least one of target OBE identity information, MV-OBE type information, or response valid time information, and wherein
the target OBE identity information is a certificate for identifying the suspicious MV-OBE, the MV-OBE type information indicates a reason why an OBE receiving the warning message is determined to be the suspicious MV-OBE, and the response valid time information indicates the response valid time when reception of a response to the warning message from the suspicious MV-OBE is awaited.

5. The method of claim 1, wherein
the response message includes at least one of OBE identity information, handling type information, handling time information, or ACK information, and wherein
the OBE identity information is a certificate for identifying the suspicious MV-OBE, the handling type information is information for clarifying handling for a detected misbehavior issue, the handling time information is information designating a time expected to handle the detected misbehavior issue, and the ACK information indicates an acknowledgement and response to the warning message.

6. The method of claim 1, wherein
the report for the suspicious MV-OBE includes at least one of the suspicious MV-OBE identity information, reporter identity information, or MV-OBE type information, and wherein
the suspicious MV-OBE identity information is a certificate for identifying the suspicious MV-OBE, the reporter identity information is a certificate for identifying the V2X communication device transmitting the report for the MV-OBE, and the MV-OBE type information indicates a reason why a report target OBE is determined to be the suspicious MV-OBE.

7. The method of claim 1, wherein
the response message is received over unicast or broadcast.

8. A V2X communication device, comprising:
a memory storing data;
a communication unit transmitting and receiving a wireless signal including a geonetworking packet; and
a processor controlling the memory and the communication unit, wherein
the processor:
transmits a beacon including misbehavior inspection zone (MIZ)-related information, the MIZ being a misbehavior inspection zone in which at least one authorized road side equipment (RSE)/OBE detects a misbehaving vehicle (MV)-OBE, and the V2X communication device corresponding to an OBE or RSE authorized for a misbehavior detection (MBD) operation;
receives a report for a possible MV-OBE;
transmits a warning message to a suspicious MV-OBE; and
based on receiving, or failing to receive, a message responsive to the warning message from the suspicious MV-OBE within a response valid time, transmits a report for the suspicious MV-OBE to a security system.

9. The V2X communication device of claim 8, wherein
the beacon includes at least one of MBD authorization information, MIZ identity information, member group information, V2X communication control information, or activity valid time information, and wherein
the MBD authorization information proves that the V2X communication device has an MBD authority, the MIZ identity information identifies at least one RSE/OBE constituting one MIZ, the member group information indicates a location of the at least one RSE/OBE having the same MIZ identity, the V2X communication control information provides V2X communication parameters of OBEs in the MIZ, and the activity valid time information indicates a limited time during which the authorized RSE/OBE performs an MBD operation.

10. The V2X communication device of claim 8, wherein
the report for the possible MV-OBE includes at least one of suspicious MV-OBE identity information, reporter identity information, or MV-OBE type information, and wherein
the suspicious MV-OBE identity information is a certificate for identifying the suspicious MV-OBE, the reporter identity information is a certificate for identifying an OBE transmitting the report for the MV-OBE, and the MV-OBE type information indicates a reason why a report target OBE is determined to be the suspicious MV-OBE.

11. The V2X communication device of claim 8, wherein
the warning message includes at least one of target OBE identity information, MV-OBE type information, or response valid time information, and wherein
the target OBE identity information is a certificate for identifying the suspicious MV-OBE, the MV-OBE type information indicates a reason why an OBE receiving the warning message is determined to be the suspicious MV-OBE, and the response valid time information indicates the response valid time when reception of a response to the warning message from the suspicious MV-OBE is awaited.

12. The V2X communication device of claim 8, wherein the response message includes at least one of OBE identity information, handling type information, handling time information, or ACK information, and wherein
the OBE identity information is a certificate for identifying the suspicious MV-OBE, the handling type information is information for clarifying handling for a detected misbehavior issue, the handling time information is information designating a time expected to handle the detected misbehavior issue, and the ACK information indicates an acknowledgement and response to the warning message.

13. The V2X communication device of claim 8, wherein the report for the suspicious MV-OBE includes at least one of the suspicious MV-OBE identity information, reporter identity information, or MV-OBE type information, and wherein
the suspicious MV-OBE identity information is a certificate for identifying the suspicious MV-OBE, the reporter identity information is a certificate for identifying the V2X communication device transmitting the report for the MV-OBE, and the MV-OBE type information indicates a reason why a report target OBE is determined to be the suspicious MV-OBE.

14. The V2X communication device of claim 8, wherein the response message is received over unicast or broadcast.

* * * * *